US007590571B1

(12) United States Patent
Betancourt

(10) Patent No.: US 7,590,571 B1
(45) Date of Patent: Sep. 15, 2009

(54) METHOD AND SYSTEM FOR AUDITING TRUCKING INVOICES

(75) Inventor: Ernest Betancourt, Lascassas, TN (US)

(73) Assignee: Betazone, Inc., Brentwood, TN (US)

( * ) Notice: Subject to any disclaimer, the term of this patent is extended or adjusted under 35 U.S.C. 154(b) by 1176 days.

(21) Appl. No.: 10/845,272

(22) Filed: May 13, 2004

Related U.S. Application Data

(60) Provisional application No. 60/471,025, filed on May 16, 2003.

(51) Int. Cl.
*G06Q 10/00* (2006.01)
*G06Q 99/00* (2006.01)

(52) U.S. Cl. .............................................. 705/28; 705/1

(58) Field of Classification Search ................... 705/28, 705/29, 35
See application file for complete search history.

(56) References Cited

U.S. PATENT DOCUMENTS

2005/0131785 A1* 6/2005 Yap .............................. 705/35
2005/0187836 A1* 8/2005 Wolfe .......................... 705/28

* cited by examiner

*Primary Examiner*—F. Zeender
*Assistant Examiner*—Denisse Ortiz Roman
(74) *Attorney, Agent, or Firm*—Stites & Harbison, PLLC; David W. Nagle, Jr.; Terry L. Wright

(57) ABSTRACT

A method and system for auditing trucking invoices uses information and data collected by the central computing systems employed by trucking companies to manage their freight transportation operations. Certain of the collected information and data can be accessed by or communicated to one or more lenders to establish the legitimacy of a particular invoice.

16 Claims, 4 Drawing Sheets

METHOD AND SYSTEM FOR AUDITING TRUCKING INVOICES

CROSS-REFERENCE TO RELATED APPLICATIONS

The present application claims priority to U.S. Provisional Application Ser. No. 60/471,025 filed May 16, 2003, the entire disclosure of which is incorporated herein by reference

BACKGROUND OF THE INVENTION

The present invention relates to a method and system for auditing trucking invoices, and, more particularly, a method and system for auditing trucking invoices based on information and data collected by the central computing systems employed by trucking companies to manage their freight transportation operations.

Trucking companies commonly employ a central computing system for managing freight transportation operations, including the receipt of orders, the dispatching of trucks based on those orders, tracking of loads in transit, and billing. Therefore, such a central computing system collects and stores a wealth of information and data that could be used to validate that an invoice submitted to a lender is genuine. For example, the Innovative Computing Corporation of Oklahoma City, Okla. (a wholly owned subsidiary of the assignee of the present application) markets such a software product for managing freight transportation operations under the mark Innovative Enterprise Software®. The method and system of the present invention is specifically adapted for use with this software product.

In the trucking and freight transportation industry, to secure immediate access to capital and manage cash flow, a trucking company often turns to asset-based lending or factoring programs. In a typical factoring transaction, once a freight load had been delivered and accepted, a trucking company submits the invoice and/or other supporting documents to a lender. The lender then advances an agreed percentage of the invoice, with the invoice essentially serving as collateral for the transaction. Unfortunately, cash-strapped trucking companies have been known to falsify invoices and/or other supporting documents to obtain additional loans. The possibility of false documents greatly increases the lender's risk, and therefore, for an invoice to have legitimate value as collateral, the lender must be able to verify that the load was indeed delivered and accepted, i.e., that the submitted invoice is genuine.

It would therefore be desirable to provide a method and system for auditing trucking invoices that relies on information and data collected by the central computing systems employed by trucking companies to manage their freight transportation operations.

SUMMARY OF THE INVENTION

The present invention is a method and system for auditing trucking invoices, and, more particularly, a method and system for auditing trucking invoices based on information and data collected by the central computing systems employed by trucking companies to manage their freight transportation operations. Such central computing systems typically manage such tasks as the receipt of orders, the dispatching of trucks based on those orders, tracking of loads in transit, and billing. Accordingly, such a central computing system is in communication with and receives incoming orders from customers of the trucking company and may be configured to communicate acceptance or denial of those orders back to the customers. Once orders have been received and accepted, the central computing system also dispatches the trucks. Furthermore, the central computing system may be configured to receive information from and track the status of each dispatched truck. Finally, certain information and data could also be collected by the central computing system from third parties, including, for example, fuel vendors.

In accordance with the method and system of the present invention, certain of the collected information and data can then be accessed by or communicated to one or more lenders for auditing purposes. In other words, such information and data can be used to establish that the particular truck that purportedly transported a freight load could logically have done so, and that the driver assigned to the particular truck did drive the freight load as invoiced. In this regard, because of the wide variety of information and data that can be readily collected and stored in the trucking company's central computing system, there are a wide range of criteria that could be used to establish the legitimacy of a particular invoice.

DETAILED DESCRIPTION OF THE INVENTION

The present invention is a method and system for auditing trucking invoices, and, more particularly, a method and system for auditing trucking invoices based on information and data collected by the central computing systems employed by trucking companies to manage their freight transportation operations.

As mentioned above, trucking companies commonly employ a central computing system for managing freight transportation operations. In this regard, such a computing system typically manages such tasks as the receipt of orders, the dispatching of trucks based on those orders, tracking of loads in transit, and billing. Information and data collected by and stored in such a computing system is invaluable in auditing and determining whether any particular invoice is genuine. Again, as mentioned above, the Innovative Computing Corporation of Oklahoma City, Okla. (a wholly owned subsidiary of the assignee of the present application) markets such a software product for managing freight transportation operations under the mark Innovative Enterprise Software®.

Figure 1:
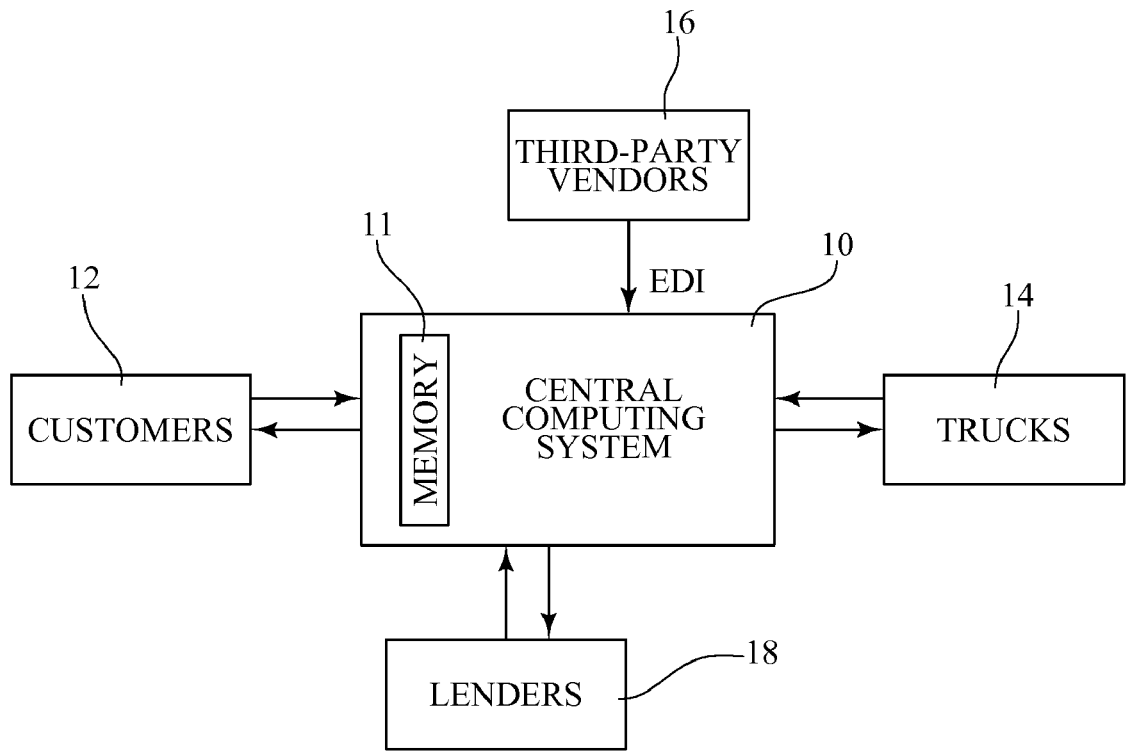
FIG. 1 is a schematic view illustrating a central computing system for managing freight transportation operations, a system at the core of the method and system of the present invention.

FIG. 1 is a schematic view illustrating a central computing system 10 for managing freight transportation operations. As shown in FIG. 1, the central computing system 10 is in communication with and receives incoming orders from customers of the trucking company, which are generally indicated by reference numeral 12. Furthermore, the central computing system 10 may be configured to communicate acceptance or denial of those orders back to the customers 12, and may also communicate billing information to the customers 12. Once orders have been received and accepted, the central computing system 10 also dispatches the trucks, which are generally indicated by reference numeral 14. Furthermore, the central computing system 10 may be configured to receive information from and track the status of each dispatched truck, as will be further described below.

For purposes of implementing the method and system of the present invention, it is also contemplated that certain information and data could be collected by the central computing system 10 from third parties, which are generally indicated by reference numeral 16. For example, fuel purchase information and data might be collected directly from third-party fuel vendors. Such information and data collection could be accomplished electronically, with the data being transferred from each third party to the trucking company's central computing system 10, preferably using electronic data interchange (EDI) or a similar transaction protocol.

Finally, as shown in FIG. 1, in accordance with the method and system of the present invention, certain information and data can be accessed by or communicated to one or more lenders, which are generally indicated by reference numeral 18, for auditing purposes, as will be further described below.

With respect to auditing invoices, the primary validation elements are the information and data that tend to establish that the particular truck that purportedly transported the freight load could logically have done so, and that the driver assigned to the particular truck did drive the freight load as invoiced. For example, information and data concerning elapsed times between certain events, fuel purchases, and reimbursable expenses are valuable in that they do tend to establish or disprove that the particular truck transported a freight load. Of course, a wide range of information and data could be evaluated, based in part on lender preference, in auditing a particular invoice.

Figures 1, 2:
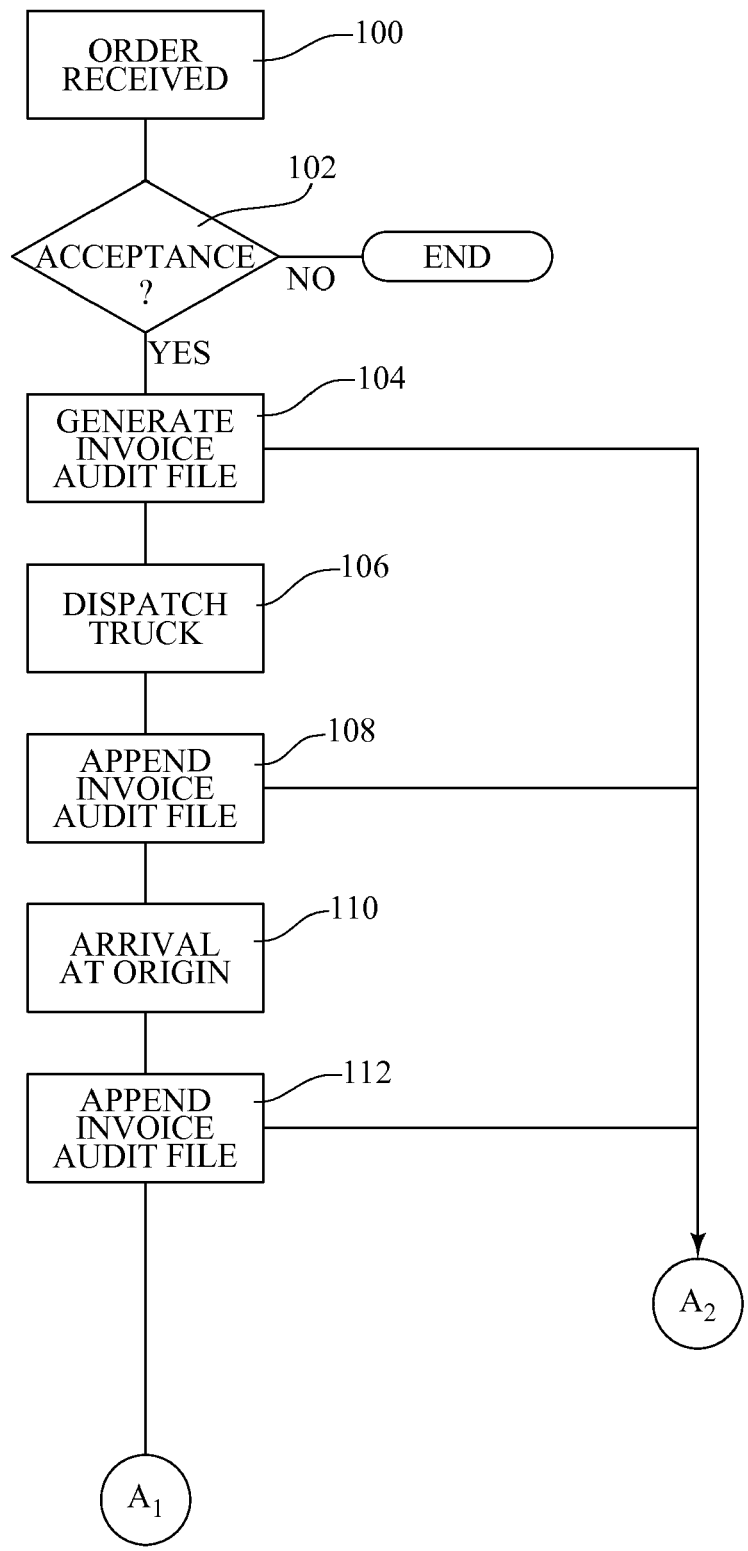
FIG. 2 illustrates the common flow of freight orders and the communication of information and data to the central computing system of FIG. 1.
Figure 2:
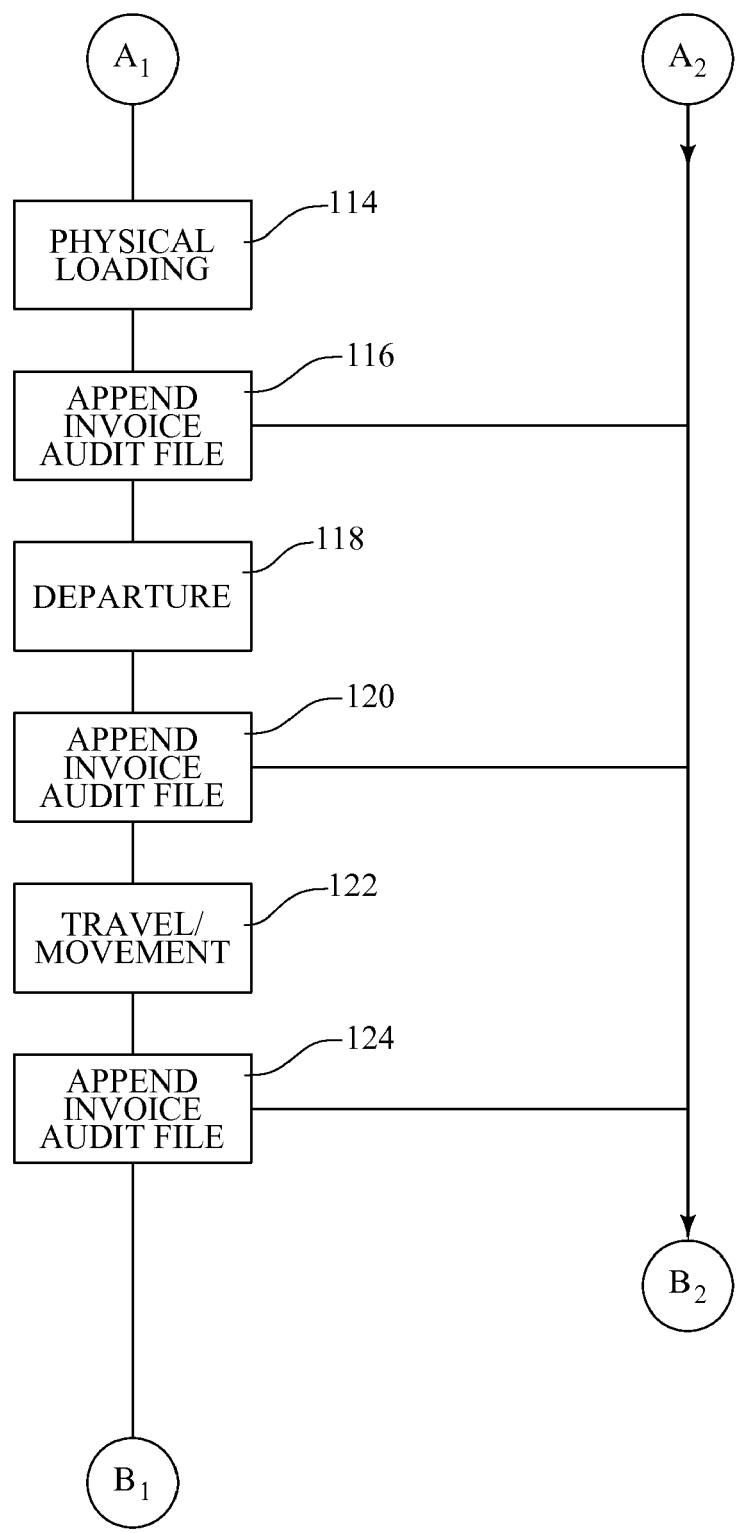
Figures 2, 3:
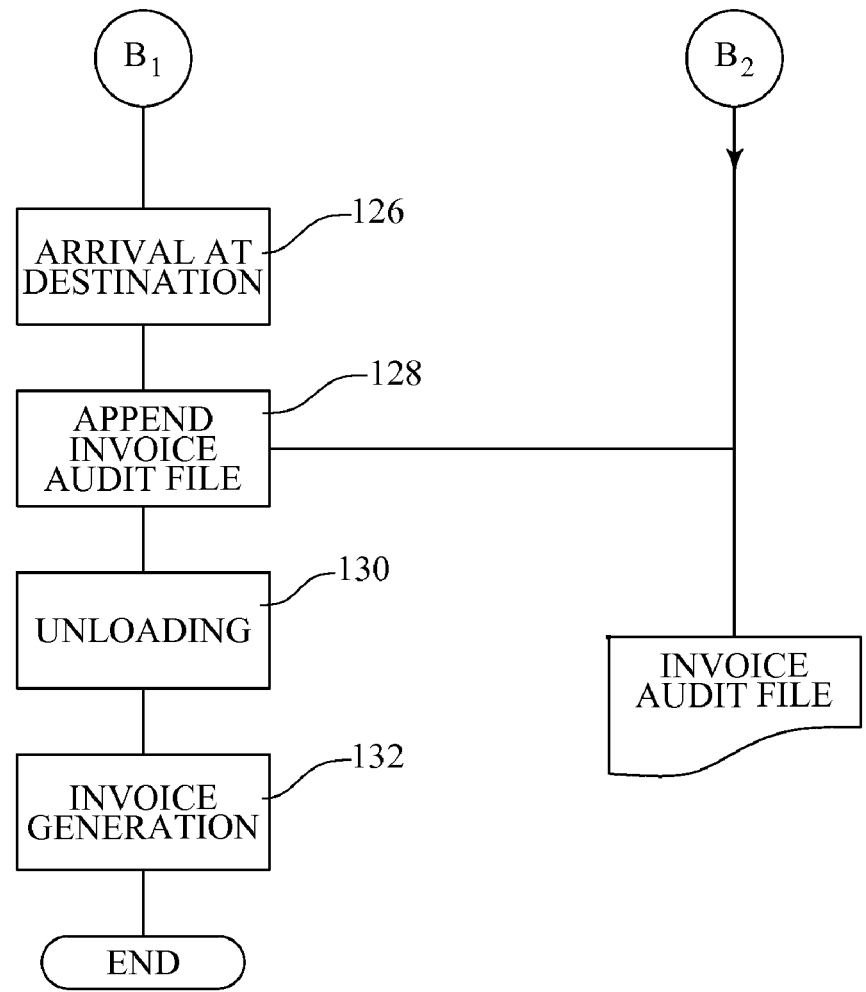

FIG. 2 illustrates the common flow of freight orders, and this flow is particularly instructive in understanding the information and data that can contemporaneously be collected and used for auditing trucking invoices in accordance with the present invention. Specifically, as shown in FIG. 2, an order is received by a trucking company from a customer, requesting transport of a freight load, as indicated at block 100. This order can be transmitted to the trucking company electronically, via facsimile, via telephone, or otherwise, but in any event, is input into the central computing system 10 (shown in FIG. 1). A decision is then made at decision 102 as to whether to accept the order. Although acceptance is often routine, there may be certain predetermined acceptance standards that may need to be satisfied before acceptance of a particular order.

Assuming the trucking company does accept the order, an invoice audit file is generated, as indicated at block 104. The general purpose of this invoice audit file is to track time differences between events and record various other information and data related to the history of transport of the freight load in order to allow for the auditing function of the present invention. For example, at this initial step when the order is accepted, the invoice audit file includes a record of the time of acceptance of the order, as well as certain information and data about the customer, such as the number of orders processed for this customer and its payment history.

Once the order has been accepted, the next step is the dispatch of a truck, i.e., the assignment of a particular driver and tractor to the order, as indicated at block 106. At the time of the dispatch, further information is appended to the audit invoice file, including, for example, the elapsed time between acceptance of the order and the dispatch of the truck, and certain information about the dispatched driver and tractor, as indicated at block 108.

After the truck has been dispatched, the next event is the arrival of the truck at the origin, i.e., a loading facility, to pick up the freight load, as indicated at block 110. When the arrival is communicated from the dispatched truck to the central computing system 10 (see FIG. 1), further information is appended to the audit invoice file, including, for example, the elapsed time between the dispatch of the truck and its arrival, as indicated at block 112.

The next step is the actual physical loading of the truck, as indicated at block 114. To the extent that there is a detention period between arrival and loading, that information is often communicated to the central computing system 10 (see FIG. 1) because it may trigger an additional charge, and this information may also be appended to the audit invoice file, as indicated at block 116. Furthermore, in most common computing systems employed by trucking companies to manage their freight transportation operations, the loading of the truck triggers a status change, with the truck now being designated as being loaded.

Once the truck has been loaded, it departs from the loading facility, as indicated by block 118. When the departure is communicated from the dispatched truck to the central computing system 10 (see FIG. 1), further information is appended to the audit invoice file, including, for example, the time of departure and the elapsed time between the arrival of the truck and its departure, as indicated at block 120.

The dispatched truck then travels to the predetermined destination for the freight load, as indicated by block 122. Throughout movement of the truck, certain information and data may be continually or periodically communicated to the central computing system 10 (see FIG. 1), and appended to the audit invoice file, as indicated by block 124. For example, the mileage traveled by the truck may be periodically recorded and appended to the audit invoice file, along with such events as inspections, fueling, rest periods, and truck servicing. For another example, check calls initiated by the driver or automatically (e.g., through a mobile communication system or via telephone) may be communicated to the central computing system 10 (see FIG. 1), which indicate the current location of the truck.

With respect to movement of the truck, as described above with respect to FIG. 1, some information and data may be collected by the central computing system 10 from third parties, such as fuel vendors, which are generally indicated by reference numeral 16. Such information and data is also appended to the invoice audit file throughout movement of the truck.

Finally, the truck arrives at the predetermined destination, as indicated by block 126 of FIG. 2. When the arrival is communicated from the dispatched truck to the central computing system 10 (see FIG. 1), further information is appended to the audit invoice file, including, for example, the elapsed time between the departure of the truck from the loading facility and its arrival at the destination and the mileage covered during the movement of the truck, as indicated at block 128. The truck is then unloaded or emptied, as indicated by block 130, the final step in the common flow of a freight orders, and in most cases, a status change is recorded, with the truck again being designated as available.

At the conclusion of this process, an invoice is generated, as indicated at block 132 of FIG. 2. Alternatively, the invoice could be generated at the loading of the truck, but the timing of invoice generation does not have a bearing on the auditing functionality of the present invention. In any event, as mentioned above, in a typical factoring transaction, once a freight load had been delivered and accepted, a trucking company submits the invoice to a lender. The lender then advances an agreed percentage of the invoice, with the invoice essentially serving as collateral for the transaction. In accordance with the method and system of the present invention, it is contemplated that the actual printing of the invoice could be controlled by a selected lender as a further security measure. In this regard, such security measures could range from ensuring that the remittance address on the invoice is that of the lender to having the physical printing of the invoice take place in a location monitored by the lender. As another alternative, the invoice may be automatically and electronically communicated from the central computing system 10 to the customer, with a copy being simultaneously communicated to the lender.

As set forth above, throughout this process, the invoice audit file associated with the freight load has been updated to track time differences between events and record various other information and data related to the history of transport of the freight load in order to allow for the auditing function of the present invention. Indeed, the information and data that can be collected as described above with reference to FIG. 2 is merely exemplary of the types of validation elements that could be used to verify that an invoice is generated, and it is contemplated that a wide variety of information and data could be evaluated to achieve the auditing functionality without departing from the spirit and scope of the present invention.

Returning to the schematic view of FIG. 1, this invoice audit file is stored in a memory register 11 associated with the central computing system 10. This invoice audit file can then be accessed by or communicated to one or more lenders 18. In this regard, it is preferred that the invoice audit file is accessed by or communicated to the lender in a manner such that the trucking company can not readily alter or change the information and data. Specifically, it is preferred that the software resident on the central computing system 10 would automatically encrypt the collected information and data throughout the processing and dispatching of an order (as illustrated in FIG. 2). However, the lenders 18 would be provided with access to these encrypted files on the central computing system 10 and would also be provided with the necessary tools to decrypt this information and data. A lender 18 can then compare the collected information and data as contained in the invoice audit file to the actual invoice generated so that the lender can verify that the load was indeed delivered and accepted, i.e., that the submitted invoice is genuine.

This comparison may be automated, with the comparison being performed based on a certain audit profile that can be customized based on lender preferences. For instance, a particular lender may be satisfied simply with elapsed time information, and provided that the times between (a) acceptance and dispatch, (b) dispatch and arrival, and/or (c) departure and arrival at destination fall within pre-established ranges, the invoice will be considered genuine and automatically approved. Alternatively, the lender may simply look at the elapsed time between loading/departure and final unloading of the truck, evaluating the revenue amount on the invoice based on a speed standard. For example, if an invoice for $500 dollars is under evaluation, and the time between loading/departure and final unloading of the truck is two hours, while the trucking company's average charge is $1.25 per hour, the truck would have had to travel 400 miles in two hours, an impossible average speed of 200 mph, to deliver the load. If the mileage traveled is also available in the invoice audit file, then the actual average speed can be calculated and compared to acceptable parameters.

Of course, because of the wide variety of information and data that can be readily collected and stored in the trucking company's existing central computing system 10, there are a wide range of criteria that could be used to establish the legitimacy of a particular invoice, i.e., that a particular truck transported a particular freight load and could logically have done so, and that the driver assigned to the particular truck did drive the freight load as invoiced. In this regard, the comparison/evaluation may take the form of a decision-tree analysis, evaluating various selected information and data until a predefined "level of comfort" is achieved, i.e., enough of the criteria are satisfied or appear to be within acceptance guidelines for a lender to feel comfortable that the invoice is genuine. Furthermore, as part of such a decision-tree analysis, certain criteria may be considered critical, and an invoice will not be considered genuine unless these criteria are satisfied.

It will be obvious to those skilled in the art that other modifications may be made to the invention described herein without departing from the spirit and scope of the present invention.

The invention claimed is:

1. A method for auditing a trucking invoice of a trucking company employing a central computing system for managing freight transportation operations, including processing orders and dispatching trucks in response to such orders, comprising the steps of:
generating an invoice audit file associated with a selected order;
using said central computing system to collect predetermined information and data during transport of a freight load for the selected order;
appending the predetermined information and data collected by said central computing system to the invoice audit file; and
providing a lender with access to said invoice audit file, such that the lender can evaluate the predetermined information and data collected during transport of the freight load to verify that the trucking invoice is genuine.

2. The method as recited in claim 1, in which software resident in said central computing system encrypts the invoice audit file, such that the trucking company can not readily alter the collected information and data.

3. The method as recited in claim 2, in which the lender is provided with software to decrypt the invoice audit file.

4. The method as recited in claim 1, in which the invoice audit file includes information and data collected from one or more third parties.

5. The method as recited in claim 4, in which said third parties include fuel vendors.

6. A method for auditing a trucking invoice of a trucking company employing a central computing system for managing freight transportation operations, including processing orders and dispatching trucks in response to such orders, comprising the steps of:
providing a communications link between each dispatched truck and the central computing system, allowing information and data related to the movement of the truck to be collected and stored by the central computing system during movement of the truck;
providing a communications link between third-party vendors and the central computing system, allowing information and data related to commercial activities of dispatched trucks to be collected and stored by the central computing system; and
providing a lender with access to the central computing system, such that the lender can evaluate the information and data collected and stored by the central computing system during movement of the truck to verify that the trucking invoice for a particular order is genuine.

7. The method and system as recited in claim 6, in which the collected information and data associated with a particular order is stored in an invoice audit file associated with that particular order.

8. The method as recited in claim 7, in which software resident in said central computing system encrypts the invoice audit file, such that the trucking company can not readily alter the collected information and data.

9. The method as recited in claim 8, in which the lender is provided with software to decrypt the invoice audit file.

10. A system for auditing a trucking invoice of a trucking company, comprising:
   a central computing system for managing freight transportation operations, including processing orders and dispatching trucks in response to such orders;
   a communications link between each dispatched truck and the central computing system, allowing information and data related to the movement of the truck to be collected and stored by the central computing system during movement of the truck; and
   a communications link providing a lender with access to the central computing system, such that the lender can evaluate certain information and data stored by the central computing system to verify that the trucking invoice for a particular order is genuine.

11. The system of claim 10, and further comprising a communications link between third-party vendors and the central computing system, allowing information and data related to commercial activities of dispatched trucks to be collected and stored by the central computing system for subsequent evaluation by the lender.

12. The system of claim 10, wherein the collected information and data associated with a particular order is stored in an invoice audit file associated with that particular order.

13. The system as recited in claim 12, wherein software resident in said central computing system encrypts the invoice audit file, such that the trucking company can not readily alter the collected information and data.

14. The method as recited in claim 13, wherein the lender is provided with software to decrypt the invoice audit file.

15. A method for auditing a trucking invoice of a trucking company employing a central computing system for managing freight transportation operations, including processing orders and dispatching trucks in response to such orders, comprising the steps of:
   generating an invoice audit file associated with a selected order;
   using said central computing system to collect fuel purchase data from vendors during transport of a freight load for the selected order;
   appending the fuel purchase data collected by said central computing system to the invoice audit file; and
   providing a lender with access to the invoice audit file, such that the lender can evaluate the fuel purchase data to verify that the trucking invoice is genuine.

16. A method for auditing a trucking invoice of a trucking company employing a central computing system for managing freight transportation operations, including processing orders and dispatching trucks in response to such orders, comprising the steps of:
   generating an invoice audit file associated with a selected order;
   using said central computing system to collect data about elapsed times between events occurring during the movement of the truck;
   appending the data collected by said central computing system to the invoice audit file; and
   providing a lender with access to said invoice audit file, such that the lender can evaluate the data collected by said central computing system to verify that the trucking invoice is genuine.

* * * * *

UNITED STATES PATENT AND TRADEMARK OFFICE
CERTIFICATE OF CORRECTION

PATENT NO.        : 7,590,571 B1                                         Page 1 of 1
APPLICATION NO. : 10/845272
DATED             : September 15, 2009
INVENTOR(S)       : Ernest Betancourt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1378 days.

Signed and Sealed this

Twenty-first Day of September, 2010

David J. Kappos
*Director of the United States Patent and Trademark Office*